Jan. 24, 1961 R. R. COOK 2,969,127
AIR PURIFIER
Filed Sept. 30, 1957 2 Sheets-Sheet 1

INVENTOR.
Richard R. Cook
BY James R. McKnight
Attorney.

Jan. 24, 1961 R. R. COOK 2,969,127
AIR PURIFIER
Filed Sept. 30, 1957 2 Sheets-Sheet 2
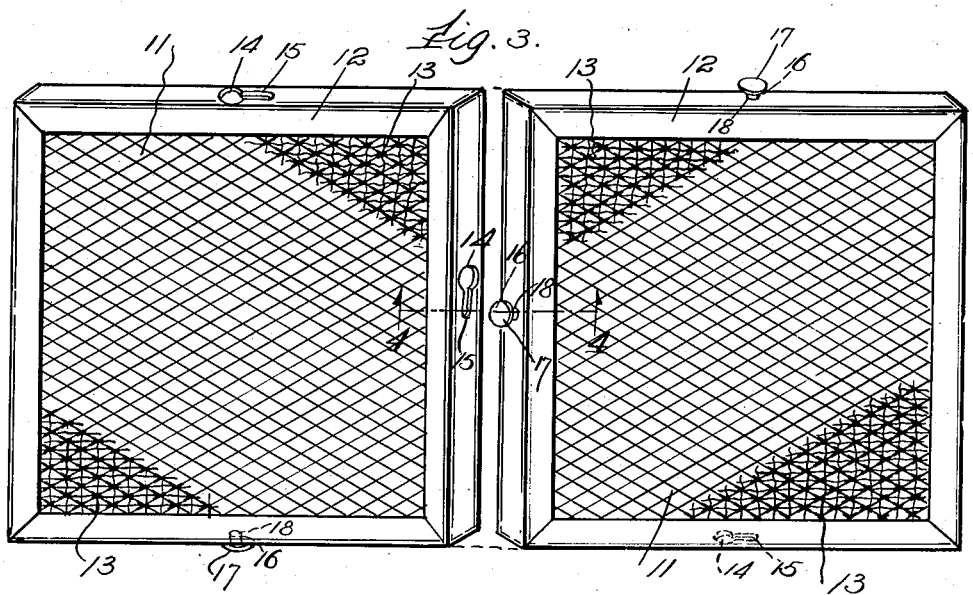
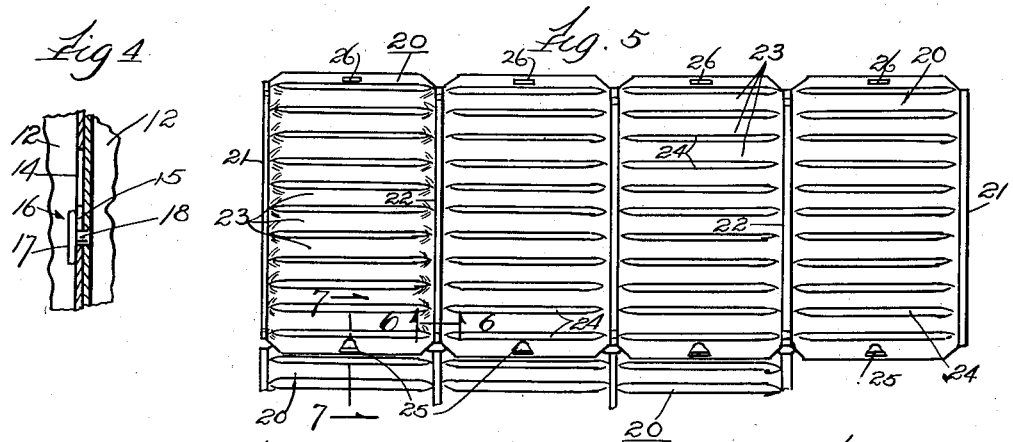
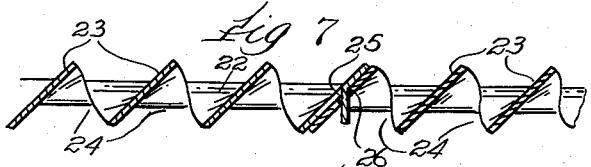
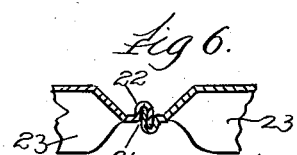
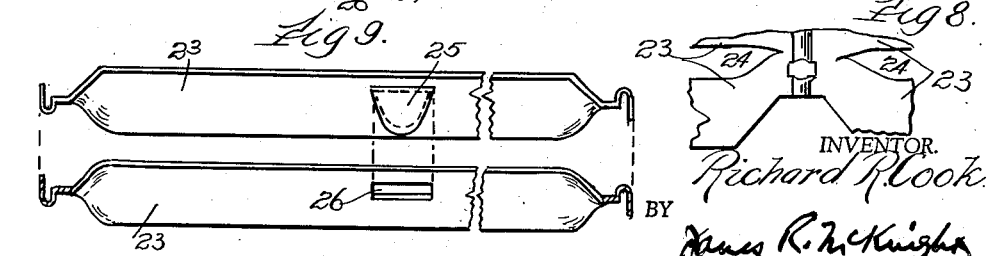
INVENTOR.
Richard R. Cook
BY
James R. McKnight
Attorney.

United States Patent Office
2,969,127
Patented Jan. 24, 1961

2,969,127
AIR PURIFIER
Richard R. Cook, 2076 Elston Ave., Chicago, Ill.
Filed Sept. 30, 1957, Ser. No. 687,321
1 Claim. (Cl. 183—7)

This invention relates to an air purifier adapted to remove coarse dirt and lint from the air by mechanical and chemical filtration and finer dirt particles therefrom by electrostatic precipitation.

It is among the objects of my invention first to provide an efficient mechanical-chemical filter to physically remove the coarse dirt and lint from the air stream, and then to draw the air with its fine dirt particles through double louvered collector plates, which are electrically charged to set up high voltage fields which in turn charge the particles and attract them for collection on the collector plates.

My electrostatic precipitator is efficient in operation, because the air passes through widely spaced louver collector plates creating turbulence instead of between flat tray-like plates.

Due to my construction of the mechanical-chemical filter and the collector plates, my device does not generate ozone, and thus eliminates ozone toxicity.

My air purifier is economical and may be readily installed in the duct of a furnace or an air conidtioning system for warm or cold air, and provides reduced maintenance and cleaning costs.

My filters are adapted removably to be attached, and my plates are also adapted removably to be attached for their respectively increased extent to fill the duct of a furnace or an air conditioner.

My invention also comprises such other objects, advantages, and capabilities as will later more fully appear and which are inherently possessed by my invention. While I have described in this specification preferred embodiments of my invention, yet it is to be understood that the same are susceptible of modification and change without departing from the spirit of my invention.

Figure 1:
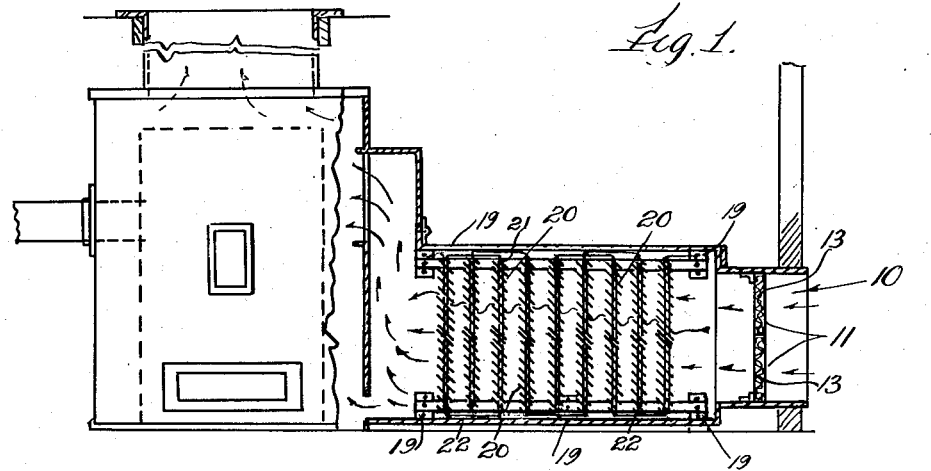
Figure 2:
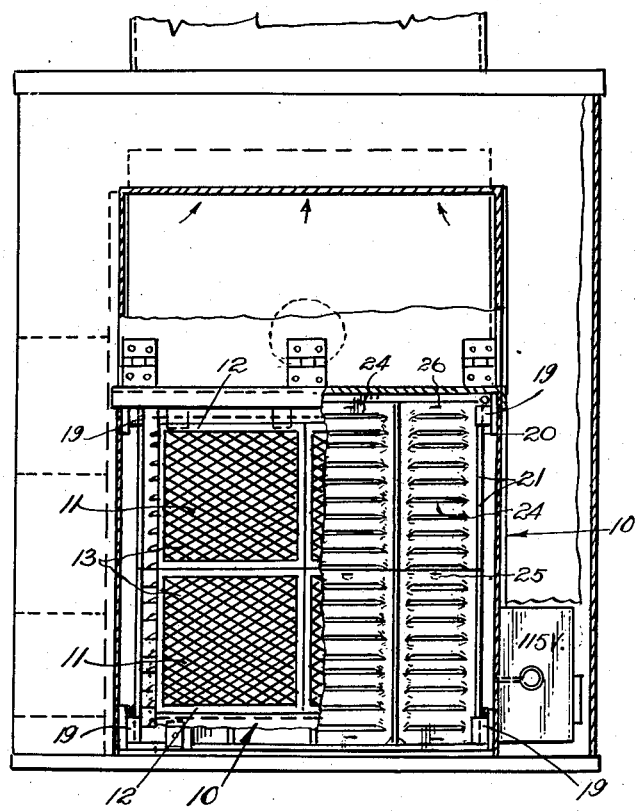

Referring to the drawings, Fig. 1 is a broken sectional side elevational view of my air purifier in a duct of a furnace or air conditioner; Fig. 2 is a broken front sectional view of the same; Fig. 3 is a front prospective view of the filters about to be joined; Fig. 4 is an enlarged sectional view on line 4—4 of Fig. 3; Fig. 5 is a plan view of attached louver sections; Fig. 6 is a sectional view on line 6—6 of Fig. 5; Fig. 7 is a sectional view on line 7—7 of Fig. 5; Fig. 8 is a top plan view of the locking indentation of louver sections; and Fig. 9 is a plan view of attached louvers.

My air purifier is adapted to be installed in the air entrance duct of a hot air furnace or an air conditioning system for providing cool air. The air entrance duct of a furnace or system in which my air purifier is positioned may be large or small and may differ in size, or shape. There is no definite shape or size for such air entrance ducts so that my air purifier must be made to conform to the duct into which it is installed.

Immediately adjacent the front of the air entrance duct 10 is positioned my mechanical-chemical filter 11, or filters 11. The entrance duct 10 is filled by the installation of the filter or filters 11 which are tightly mounted and sealed against the walls of such duct 10, to prevent air passage, except through said filter or filters 11.

My filter 11 has a metal frame 12 within which is a filler 13 of felt, metal, paper, fiber glass or other suitable material. I prefer that filler 13 be composed of expanded washable aluminum foil. Filter 11 is also coated with a chemical-preparation which facilitates the removal of large or heavy particles from the air.

In some instances a single filter 11 may not be large enough to fill the entrance space of duct 10. In such a situation, I provide an opening 14 in one end of frame 12, with a narrowed slot 15 communicating with opening 14. In another filter unit 11, I provide a stud 16 having a head 17 with its shank 18 attached to a corresponding end of frame 12. This permits two filters to be removably attached to fill duct 10 by inserting head 17 into opening 14 and then moving shank 18 into slot 15. Additional filter units 11 if needed to fill duct 10 may be added by the provision of openings and slots 14 and 15 and studs 16 with head 17 and shank 18 to the adjoining filters 11 as heretofore set forth.

Inwardly within the furnace or air conditioner, and spaced beyond filter or filters 11, duct 10 has a plurality of brackets 19 in opposite walls removably to receive louvered collector plates 20. Each of my plates has a margin 21 at each end and at each side to form a set or section 22. Each of plates 20 has a plurality of fins 23. Each fin is formed so that its top portion extends above margin 21 and its bottom portion extends below said margin with a diagonal portion of the fin between its top and bottom. Each fin 23 is spaced from the adjacent fin by an opening 24. In one form of my louver, the top of each fin extends as far above the margin as the bottom of each fin extends below said margin.

When it is desired to attach a set 22 of plates 20 together so as to be large enough to fill duct 10, the end fin 23 on each section 22 of one plate 20 has a cut out and bent up tab 25. These tabs 25 receive similarly placed openings 26 provided in the end fin 23 of each section 22 of the adjacent plate 20. In this way plates 20 may be removably joined to fill the space in duct 10. Additional plates may be joined by providing tabs 25 and openings 26 as heretofore set forth.

The furnace or air conidtioner is suitably provided with means for forcing air into air entrance duct 10. I also provide an electric power supply means suitably connected to an electric source of power and so as to transform 115 volt A.C. into 10,000 D.C. to 14,000 D.C. which is applied to alternate sets 22 of collector plates 20 of my air purifier which results in a full potential difference between each adjoining pair of collector plates. Means are provided for operating the power pack.

My plates 20 are uniformly, widely spaced by brackets 19 substantially an inch apart from each other. This width permits the air to pass rapidly with a minimum of resistance. Because the fins on alternate sets of plates direct the air in different directions, there is greater turbulence. The small particles are charged while passing through the magnetic field caused by the charged collector plates and are attracted to deposit on collector plates of the opposite polarity.

In prior art constructions where there is no use of an entrance mechanical-chemical filter to remove the heavier particles and flat, parallel close together plates are used, the plates are soon filled with particles which causes constant sparking and the generation of considerable ozone. Frequent removal or cleaning and flushing of such plates is necessary to wash off the accumulated dirt and reduce the ozone production. With my construction the filling or blocking of the plates is minimized, if not prevented. The result is greater efficiency, economy and the elimination of sparking and the generation of obnoxious and dangerous ozone.

The mechanical-chemical filter and the collector plates are coated with a chemical solution which holds the dirt and dust and also germs and virus firmly until they are inactivated and killed. This adhesive, or coating solution holds all particles deposited on them.

The adhesive is germicidal and fungicidal and destroys all bacteria and virus collected on the plates. It is water soluble and therefore allows the dirt to be flushed off easily under a faucet or hose. It will not dry out in hot weather and will not become fluid during humid weather. It is non-corrosive, odorless, flameproof, and electrically conductive. It will not irritate the hands. The mechanical-chemical filter and the collector plates may be easily removed, washed, recoated and replaced. The adhesive places a fine film over the mechanical-chemical filter and the collector plates.

In use, contaminated air flows into the mechanical-chemical filter where all coarse particles are removed. The partially cleaned air now moves through the electronic field of the electrostatic plates. Here the fine particles are removed—such as lint, dust, pollen, allergenic particles, mists, molds, fluid droplets, mildew and fungus, bacteria and virus carried on the above particles as well as many other micro organisms. The cleaned air moves on to be heated or cooled for distribution through the building.

My filters 11 and plates 20 may be installed vertically or horizontally with equally successful operating efficiency.

In many instances duct 10 is of such a size that it may be fitted with filters 11 and collector plates 20 of the standard size made by applicant. In other instances duct 10 may be fitted by joining a plurality of filters 11 and collector plates 20 as heretofore set forth. In other situations where the duct 10 is a fraction over the size of a single filter or a plurality of filters, and of a size slightly larger than collector plate 20 or multiplications thereof, a fractional sized filter and a collector plate sufficiently smaller than standard size may be specifically made to fill up the fractional space in duct 10.

Having thus described my invention, I claim:

In a device for providing warm or cold air having an air entrance duct, and means for moving the air, air purifying means in said air entrance duct comprising a plurality of filters arranged in side-by-side relation and a plurality of sets of collector plates arranged in series inwardly from said filters and a power pack connected to an electrical source of power for applying high voltage to alternate sets of collector plates, each of said filters having a central filter portion of expanded washable aluminum foil, and a metal frame surrounding the central portion, said filters adapted to remove heavy, coarse and large particles from the air, one of said filters having a stud with a shank and a head on said frame, and the adjacent filter having an opening and a narrowed slot adapted to receive the head and shank of the stud on the first mentioned filter for removably attaching the filters together in side-by-side relation, and enough of said adjacent filters being so attached together until the filters total sufficient size to fill the air entrance duct at its entrance where the air comes in, each set of collector plates having a plurality of plates, with each plate formed with a margin and spaced openings and fins extending equally as far above as below said margin, the bottom fin of each plate having an opening, and the top fin of each adjacent plate having a bent up tab so that said tab may enter the opening for holding adjacent plates together in side-by-side relation, said plates joinable side-by-side in each set until of sufficient total size to extend across and fill the air entrance duct.

References Cited in the file of this patent

UNITED STATES PATENTS

| | | |
|---|---|---|
| 1,231,289 | Otte | June 26, 1917 |
| 1,450,951 | Cruyt | Apr. 10, 1923 |
| 1,848,576 | Sandel | Mar. 8, 1932 |
| 1,898,424 | Collins | Feb. 21, 1933 |
| 2,077,951 | Myers | Apr. 20, 1937 |
| 2,450,191 | Feinberg | Sept. 28, 1948 |
| 2,486,520 | Dahlman | Nov. 1, 1949 |
| 2,660,270 | Jenkins et al. | Nov. 24, 1953 |
| 2,729,302 | True | Jan. 3, 1956 |
| 2,778,443 | Yereance | Jan. 22, 1957 |

FOREIGN PATENTS

| | | |
|---|---|---|
| 90,856 | Austria | Jan. 25, 1923 |
| 737,519 | France | Dec. 13, 1932 |